(12) United States Patent
Hamilton, II et al.

(10) Patent No.: US 8,595,632 B2
(45) Date of Patent: Nov. 26, 2013

(54) METHOD TO MONITOR USER TRAJECTORIES WITHIN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 12/035,044

(22) Filed: Feb. 21, 2008

(65) Prior Publication Data
US 2009/0217171 A1    Aug. 27, 2009

(51) Int. Cl.
*G06F 3/048* (2013.01)

(52) U.S. Cl.
USPC .......................................................... 715/757

(58) Field of Classification Search
USPC ......... 715/706, 710–713, 719–722, 757–758, 715/848–850
See application file for complete search history.

(56) References Cited

U.S. PATENT DOCUMENTS

| | | | | |
|---|---|---|---|---|
| 5,354,202 | A * | 10/1994 | Moncrief et al. | 434/69 |
| 5,990,896 | A * | 11/1999 | Barrus | 345/420 |
| 6,244,987 | B1 * | 6/2001 | Ohsuga et al. | 482/4 |
| 6,473,083 | B1 | 10/2002 | Suzuki et al. | |
| 6,731,279 | B2 | 5/2004 | Suzuki et al. | |
| 6,909,429 | B2 * | 6/2005 | Gottesman et al. | 345/419 |
| 7,293,235 | B1 * | 11/2007 | Powers et al. | 715/706 |
| 7,467,356 | B2 * | 12/2008 | Gettman et al. | 715/850 |
| 2003/0120823 | A1 * | 6/2003 | Kim et al. | 709/310 |
| 2004/0225716 | A1 * | 11/2004 | Shamir et al. | 709/204 |
| 2006/0184886 | A1 * | 8/2006 | Chung et al. | 715/758 |
| 2006/0221187 | A1 | 10/2006 | Alhadef | |
| 2008/0086696 | A1 * | 4/2008 | Sri Prakash et al. | 715/757 |
| 2008/0097805 | A1 * | 4/2008 | Wells | 705/7 |
| 2008/0120558 | A1 * | 5/2008 | Nathan et al. | 715/764 |
| 2008/0134056 | A1 * | 6/2008 | Shuster | 715/757 |
| 2008/0167122 | A1 * | 7/2008 | Maeda et al. | 463/30 |
| 2008/0215994 | A1 * | 9/2008 | Harrison et al. | 715/757 |
| 2009/0093313 | A1 * | 4/2009 | Yabuki et al. | 463/43 |
| 2009/0125819 | A1 * | 5/2009 | Hamilton et al. | 715/757 |
| 2010/0082798 | A1 * | 4/2010 | Bhogal et al. | 709/224 |
| 2010/0088650 | A1 * | 4/2010 | Kaltenbach et al. | 715/849 |
| 2010/0153860 | A1 * | 6/2010 | Dawson et al. | 715/757 |
| 2010/0161439 | A1 * | 6/2010 | Hamilton et al. | 705/26 |
| 2010/0161456 | A1 * | 6/2010 | Boss et al. | 705/30 |
| 2010/0161788 | A1 * | 6/2010 | Boss et al. | 709/224 |
| 2010/0199193 | A1 * | 8/2010 | Hamilton et al. | 715/757 |
| 2010/0241525 | A1 * | 9/2010 | Aguera y Arcas et al. | 705/27 |
| 2010/0250022 | A1 * | 9/2010 | Hines et al. | 701/2 |

\* cited by examiner

*Primary Examiner* — Ramsey Refai
*Assistant Examiner* — William Titcomb
(74) *Attorney, Agent, or Firm* — Lisa Ulrich; Hoffman Warnick LLC (57) ABSTRACT

The present invention is directed to a method to monitor user trajectories within a virtual universe. A method for monitoring a user trajectory of any avatar in a virtual universe may include recording an activity of an avatar within a virtual universe, and then rendering the recording as a visible path. The activity may include movement, duration at a coordinate, time between coordinates, and/or angle of positioning of the avatar. The invention, for example, reminds an avatar a reminder as to where he/she has traversed in the past; shows paths that their team or family members have traversed; and/or gives an indication of popular paths taken by avatars.

20 Claims, 9 Drawing Sheets

METHOD TO MONITOR USER TRAJECTORIES WITHIN A VIRTUAL UNIVERSE

FIELD OF THE INVENTION

The present invention relates to obtaining information about the movement of an entity in a virtual universe, and more specifically to a method to monitor user trajectories within a virtual universe.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the environment allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming, exploration, and travel, as well as real-life simulations in virtual spaces. While virtual environments allow avatars to move between different locations, there are no known methods of tracking movements of the avatar to allow either the traveling avatar him/herself, or other avatars (e.g., third parties), to know where the avatar has traveled. As a result, for example, virtual city planners, civil engineers, and other agents are unable to plan, design, modify, and/or construct any new aspects of the virtual universe that incorporate or account for any of these various movements.

Accordingly, there is an opportunity to improve upon the existing virtual universe experience.

SUMMARY OF THE INVENTION

The present invention is directed to a method to monitor user trajectories within a virtual universe.

A first aspect of the present invention is directed to a method for monitoring a user trajectory in a virtual universe, comprising: recording an activity of at least one avatar within a virtual universe; and rendering the recording as a visible path.

A second aspect of the present invention is directed to a system for monitoring a user trajectory in a virtual universe, comprising: a system for recording an activity of at least one avatar within a virtual universe; and a system for rendering the recording as a visible path.

A third aspect of the present invention is directed to a program product stored on a computer readable medium, which when executed, monitors a user trajectory in a virtual universe, the computer readable medium comprising program code for: recording an activity of at least one avatar within a virtual universe; and rendering the recording as a visible path.

A fourth aspect of the present invention is directed to a method for deploying an application for monitoring a user trajectory in a virtual universe, comprising: providing a computer infrastructure being operable to: record an activity of at least one avatar within a virtual universe; and render the recording as a visible path.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention provides a method to monitor user trajectories within a virtual universe. The method has a multitude of uses including both informational and accountability reasons such as for guidance, tutorials, creating games, race officiating, urban and traffic planning, compensation for visiting certain, or all, aisles of a store, and/or compensation for seeing a set of billboard advertisements. Amongst other improvements, aspects of the invention encourage avatars to become familiar with store aisles, mall thoroughfares, paths through markets or particular products. The method may increase the odds of impulse buying and encourage teleporting to a quantity of locations in a virtual universe so that many stores are visited. Similarly, aspects of the invention may give an avatar a reminder as to where he/she has traversed in the past; show paths that their team or family members have traversed; and/or give an indication of popular paths taken by avatars.

Figure 1:
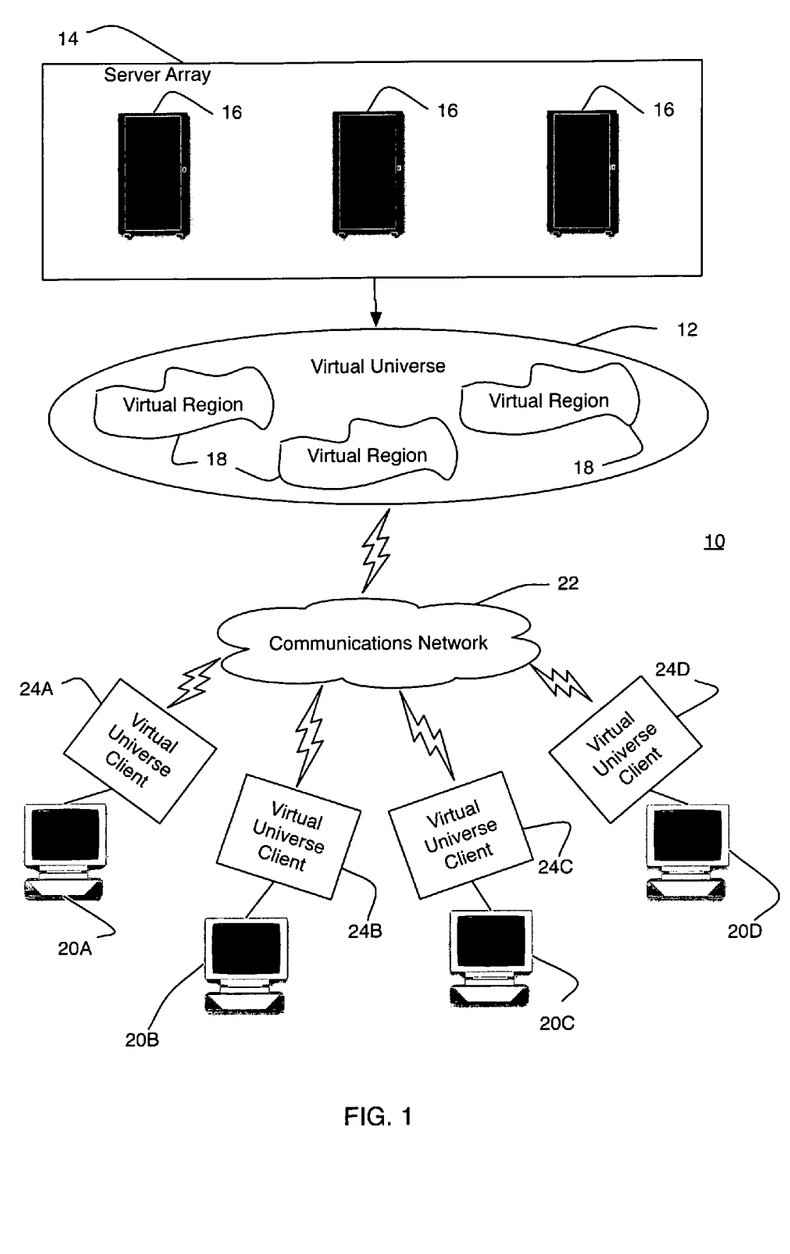
FIG. 1 depicts a high-level schematic diagram showing a networking environment for providing a virtual universe in accordance with an embodiment of the present invention.

FIG. 1 shows a high-level schematic diagram showing a networking environment 10 for providing a virtual universe 12 according to one embodiment of this invention in which a service for monitoring user trajectories within the virtual universe can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computer 20 (e.g., 20A, 20B, 20C, 20D) interact with the virtual universe 12 through a communication network 22 via a virtual universe client 24 (e.g., 24A, 24B, 24C, 24D) that resides in the computer. Below are further details of the virtual universe 12, server array 14, and virtual universe client 24A, 24B, 24C, 24D.

Figure 2A:
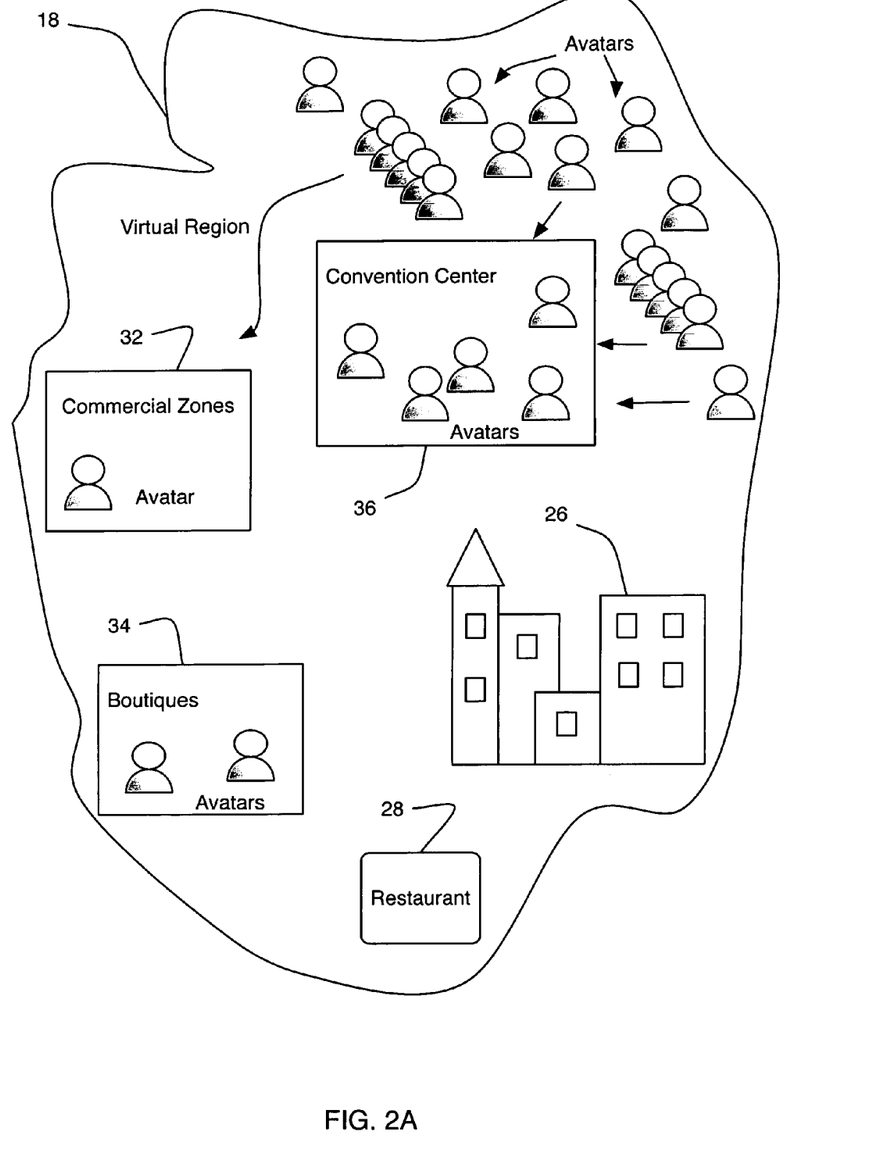
FIG. 2A depicts a more detailed view of a virtual region shown in the virtual universe of FIG. 1 in accordance with an embodiment of the present invention.

FIG. 2A shows a more detailed view of a virtual region shown 18 in the virtual universe 12 of FIG. 1 with avatars concentrated in various locations of the virtual region. As an example, the virtual region 18 shown in FIG. 2A comprises a downtown office center 26, restaurants 28 commercial zones 32 and boutiques 34 for shopping and a convention center 36 for meetings and various conventions. These examples of items in the virtual region 18 shown in FIG. 2A are only illustrative of some things that may be found in a virtual region 18 and those skilled in the art will recognize that these regions can have many more items that can be found in a real-life universe as well as things that do not presently exist in real life.

Residents or avatars which as mentioned above are personas or representations of the users of the virtual universe, roam all about the virtual region by walking, driving, flying or even by teleportation or transportation which is essentially moving through space from one point to another, more or less instantaneously. As shown in FIG. 2A, there is a large concentration of avatars in or near the convention center 36, whereas there is only one avatar at the commercial zones 32, two avatars at the boutiques and none at the downtown office center 26 and restaurants 28. An avatar, or group of avatars, move from one location to another within the virtual region 18. For example, the movement, or trajectory, may be intra or inter virtual region 18. Similarly, the movement, or trajectory, by the avatar(s) may be within, for example, a boutique 34, commercial zone 34, convention center 36, and/or the like or may be between two or more of the locations within the virtual region 18. In any event, aspects of the method allow for the monitoring of the user (e.g., avatar(s)) trajectory in the virtual universe 12.

Figure 2B:
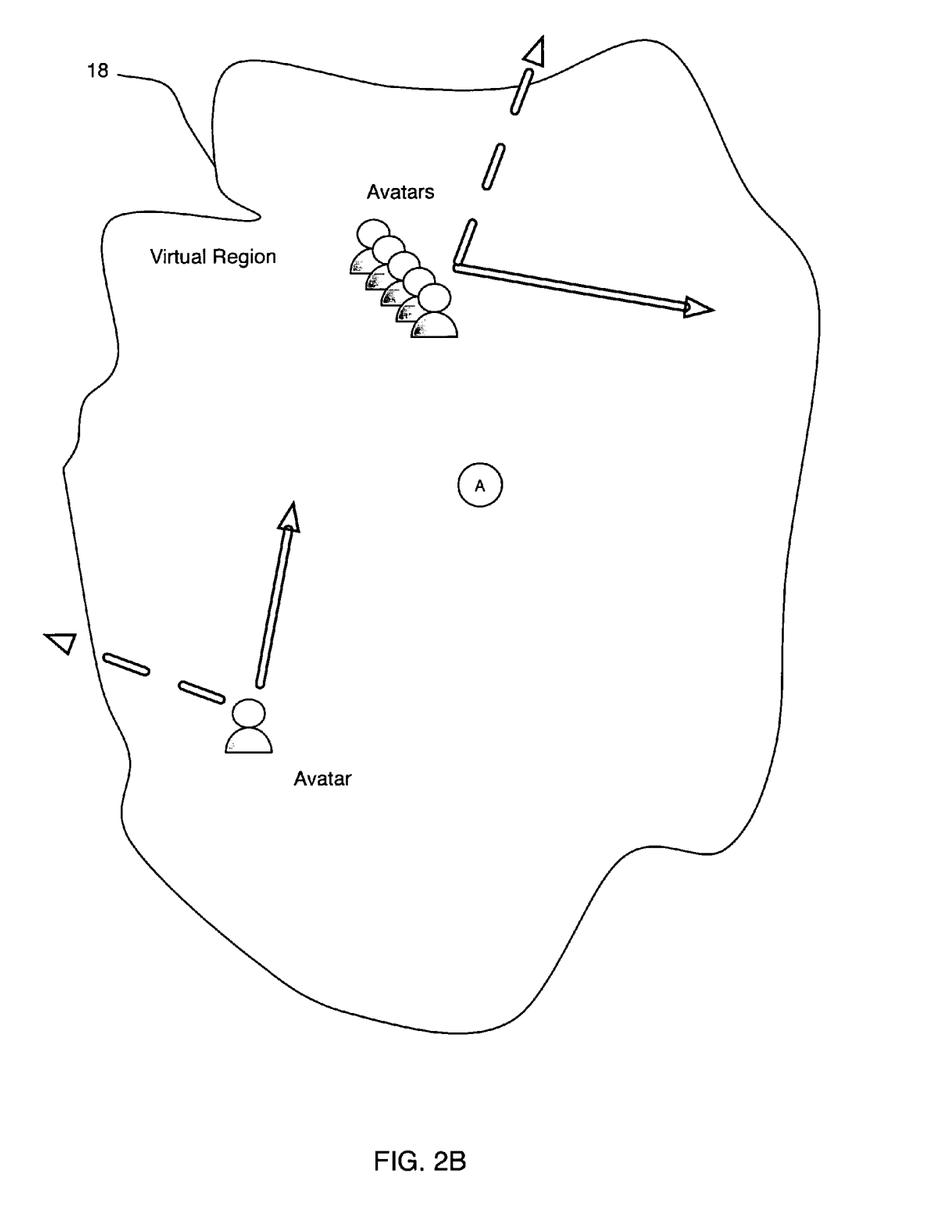
FIG. 2B depicts a more detailed view of avatar trajectories in a virtual region shown in the virtual universe of FIG. 1 in accordance with an embodiment of the present invention.
Figure 2C:
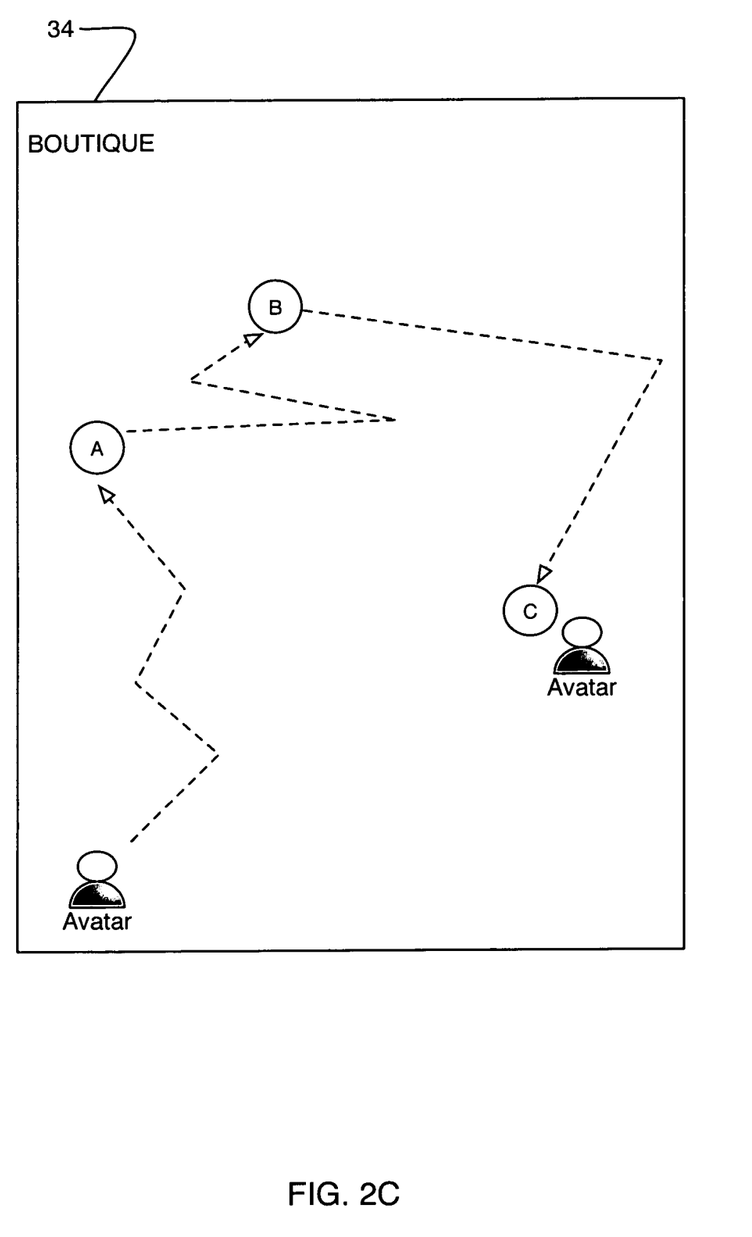
FIG. 2C depicts a more detailed view of avatar trajectory in a boutique shown in the virtual universe of FIG. 1 in accordance with an embodiment of the present invention.

As more specifically shown in FIGS. 2B and 2C, an avatar, or group of avatars, moves within the virtual universe 12. For example, a single avatar in FIG. 2B may move within virtual region 18 and/or beyond the virtual region 18 (dotted line) to another virtual region (FIG. 1). Similarly, a group of avatars also may move within virtual region 18 and/or beyond the virtual region 18 (dotted line) to another virtual region (FIG. 1). The single avatar, or group of avatars may, or may not, move to/from location "A". FIG. 2C depicts an avatar's movement, for example, within a boutique 34. Under this embodiment, the avatar moves to location "A"; then to location "B"; and finally to location "C". Clearly, a near infinite variety of movements; locations; and/or in or between virtual regions 18 is available for monitoring under aspects of the present invention.

Figure 3:
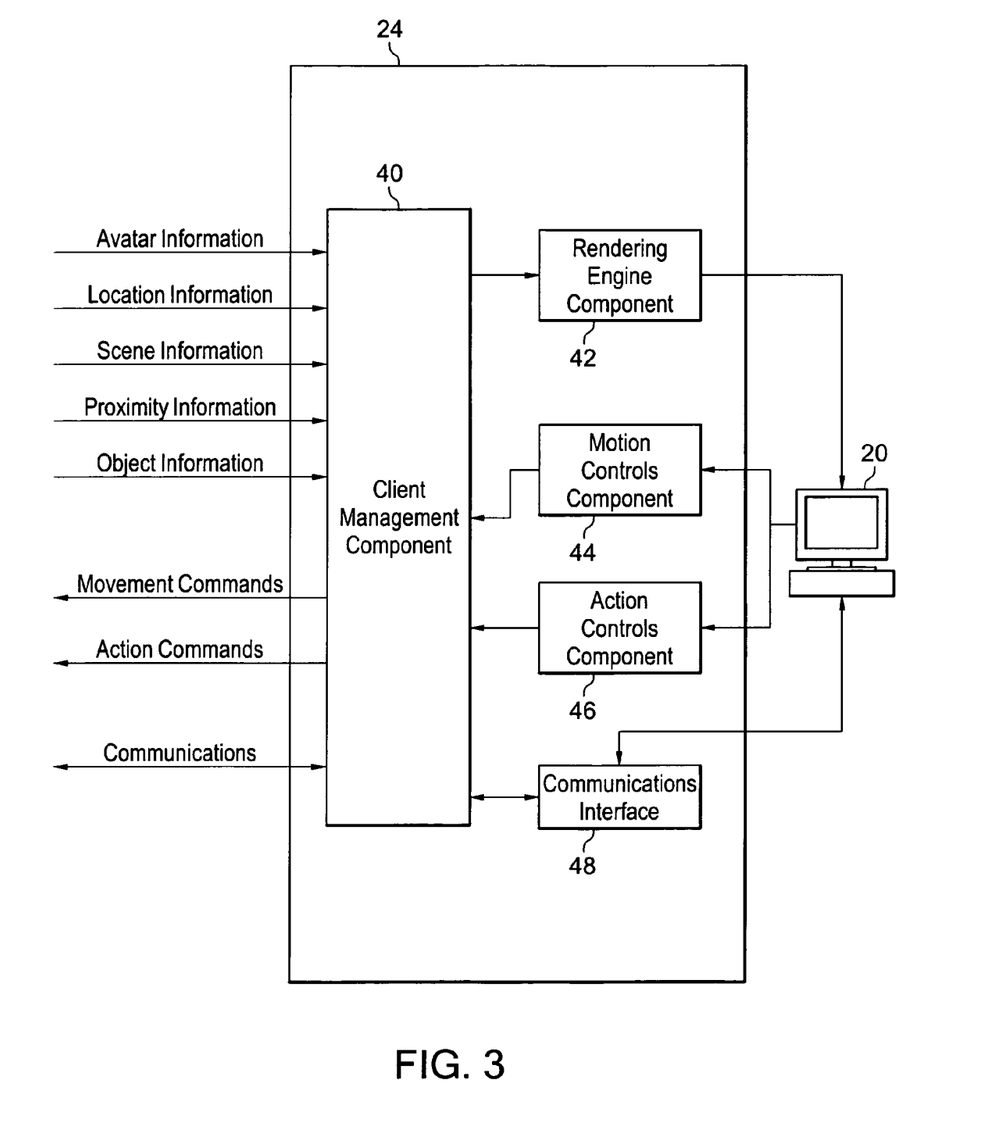
FIG. 3 depicts a more detailed view of the virtual universe client shown in FIG. 1 in accordance with an embodiment of the present invention.

FIG. 3 shows a more detailed view of one of the virtual universe clients 24A, 24B, 24C, 24D shown in FIG. 1. The virtual universe client 24, which enables users to interact with the virtual universe 12, comprises a client management component 40, which manages actions, movements and communications made by a user through computer 20 (e.g., 20A, 20B, 20C, 20D at FIG. 1), and information received from the virtual universe 12 through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 3 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.) and what actions are possible for nearby objects (e.g., postures, movements). FIG. 3 also shows the movement commands and action commands that are generated by the user that are sent to the server array via the client management component 40, as well as the communications that can be sent to the users of other avatars within the virtual universe.

Figure 4:
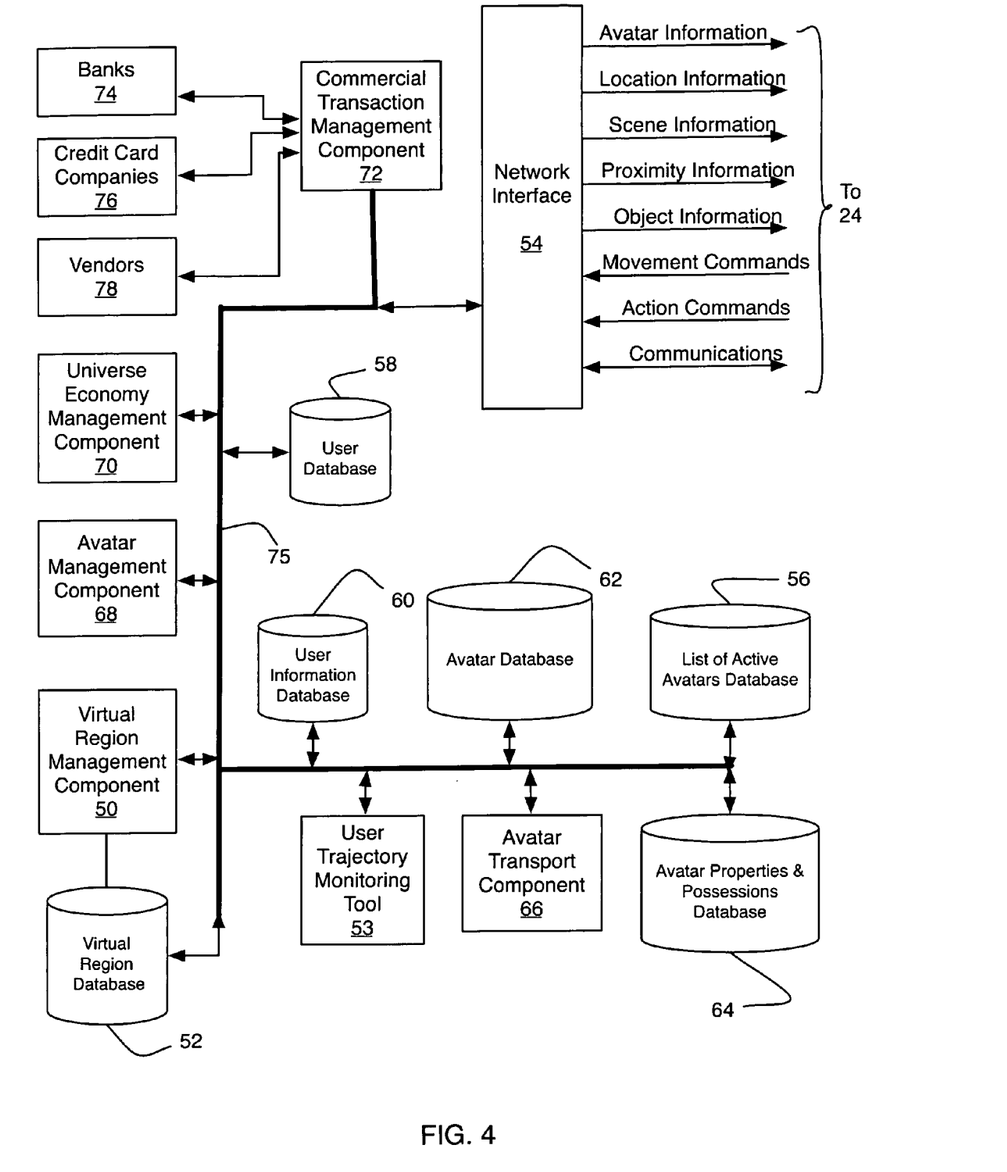
FIG. 4 depicts a more detailed view of some of the functionalities provided by the server array shown in FIG. 1 in accordance with an embodiment of the present invention.

FIG. 4 shows a more detailed view of some of the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, bridges, highways, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

A user trajectory monitoring tool 53 monitors a user trajectory in the virtual universe 12. Below is a more detailed discussion of the user trajectory monitoring tool 53 and how it monitors a user trajectory in a virtual universe 12, including a discussion on how the tool 53 records movements of the user in the virtual universe and processes the recorded movements.

FIG. 4 shows a network interface 54 that enables the server array 14 to interact with the virtual universe client 24 residing on computer 20. In particular, the network interface 54 communicates information that includes information pertaining to avatars, location, trajectory, scene, proximity and objects to the user through the virtual universe client 24 and receives movement and action commands as well as communications from the user via the universe client.

As shown in FIG. 4, there are several different databases for storing information. In particular, database 56 contains a list of all the avatars that are on-line in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables individual avatars to transport, which as mentioned above, allows avatars to transport through space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 to facilitate such a transaction.

The components in FIG. 4 are all interconnected via an interconnect 75. Although shown in FIG. 4 as connected via interconnect 75, all of the components may be configured to interact with each other using other means now known or later developed. The components that are shown as being interconnected via interconnect 75 are illustrated in that manner to convey the close interactions that exist between these components such as the banks 74, credit card companies 76, and vendors with the commercial transaction management component 72.

Figure 5:
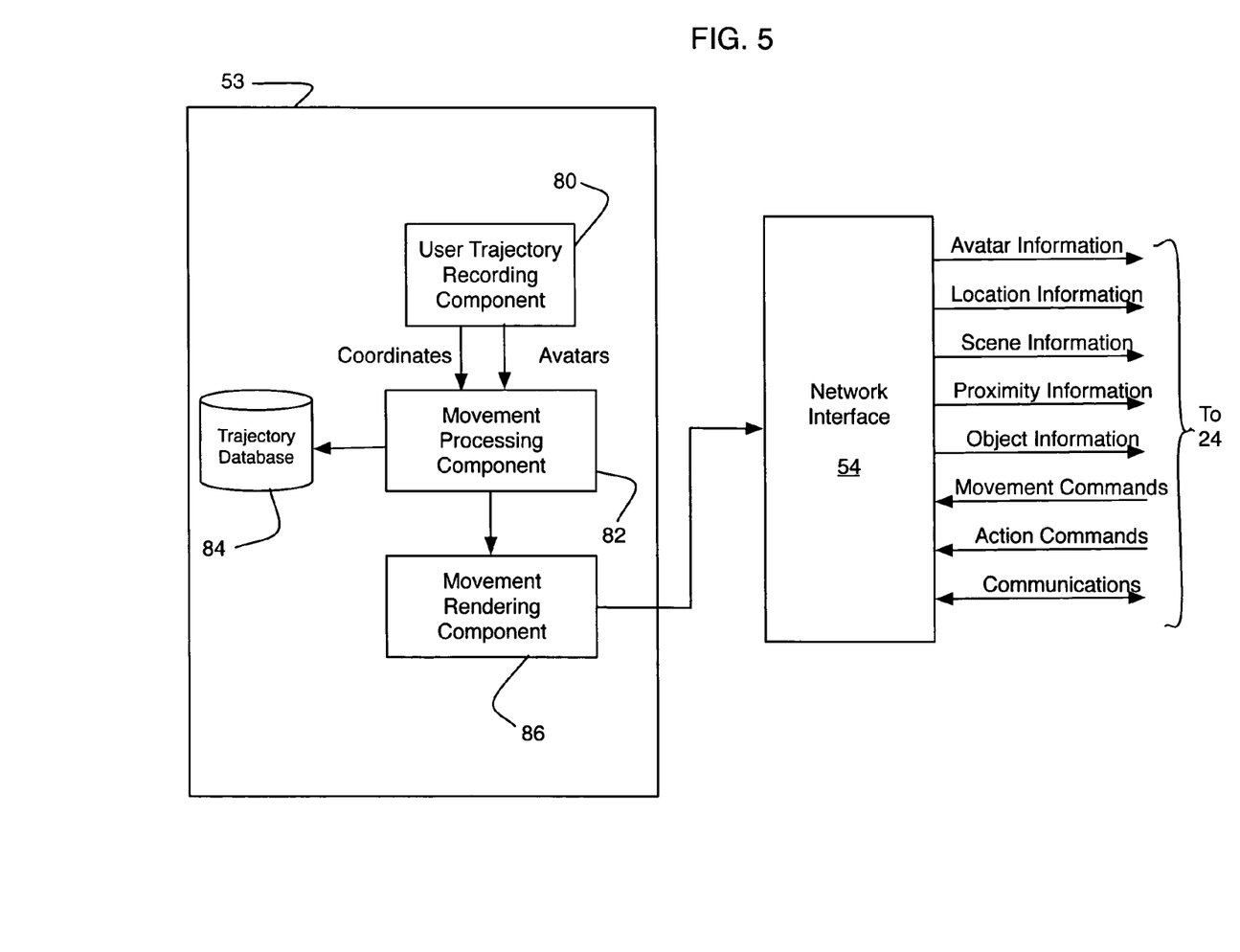
FIG. 5 depicts a more detailed view of a user trajectory monitoring tool in accordance with an embodiment of the present invention.

FIG. 5 shows a more detailed view of a user trajectory monitoring tool 53 shown in FIG. 4 according to one embodiment of the invention. As mentioned above, the user trajectory monitoring tool 53 monitors user trajectories within a virtual universe 12. As shown in FIG. 5, in one embodiment, the user trajectory monitoring tool 53 resides on a computer system that is a part of the server array 14 and communicates directly to the virtual universe and its residents via the virtual universe client 24. In other embodiments, the user trajectory monitoring tool 53 might reside on separate computers in direct communication with the virtual universe servers 16 and universe clients 24.

The user trajectory monitoring tool 53 comprises a user trajectory recording component 80 configured to record movement of at least one user (e.g., avatar) within the virtual universe 12. The user trajectory recording component 80 is configured to monitor and record the locations of the avatars that are on-line in the virtual universe 12. The user trajectory recording component 80 monitors the locations of the avatar by using data obtained by a virtual universe server 16 such as location information, coordinate information, scene information, proximity information and object information and data received from virtual universe client 24 such as avatar location coordinates, avatar movement commands and avatar action commands. All of this information is typically used by virtual universe grid software that runs on the virtual universe client 24.

A movement processing component 82 is configured to receive the recorded movements of at least one user from the user trajectory recording component 80 and use this data (e.g., recorded movements) to process them. In particular, the movement processing component 82 may store the recorded movements in the trajectory database 84.

A trajectory database 84 coupled to the movement processing component 82 contains data such as an avatar, or group of avatars movements, coordinates, locations arrived at, locations avoided, times for various locations, and/or the like. Although not shown in FIG. 5, the trajectory database 84 receives information directly from other components in the virtual universe server 16 such as location information, scene information, proximity information, object information, etc.

Referring back to FIG. 5, the user trajectory monitoring tool 53 further comprises a movement rendering component 86 configured to render the recorded and processing movement of the user in the virtual universe 12. The movement rendering component 86 is configured to provide a physical rendering of at least one user's movement. In various embodiments, the rendering can be a map view, a visual rendering, an aural rendering, and/or the like so as to allow either the particular avatar, other avatar(s), and/or a third party to readily monitor a user's trajectory.

In an embodiment, an avatar may selectively opt to record his/her own movement. Alternatively, subject to privacy capabilities, the avatar may select movement tracking for another avatar, a group of avatars, and/or all avatars. In another embodiment, subject to privacy capabilities, an administrator or other third party may select movement tracking for one avatar, a select group of avatars, and/or all avatars. Depending on embodiments, the movement tracking may be anonymous or with knowledge of the particular tracked avatar. The request may be initiated with a selection of a graphical icon, keyboard shortcut, or other potential means of interacting with a virtual universe.

The recording mode may record movement in the virtual universe; establish a path without traversing (e.g., map view); and/or selecting a region or area to monitor for avatar movement.

The recording may include recording of the unique coordinates representing a traversal path of the applicable avatar, until the recording mode is stopped. Similarly, in map view, the coordinates of the pointer or other input device(s) are saved. In other embodiments, in addition to recording movement, a time duration spent while paused at coordinates is recorded; time duration between coordinates is recorded; and/or an angle at which the avatar is positioned while at a particular coordinate is recorded. In this manner, various data may be gathered regarding behavior of a single avatar or group of avatars that is useful to various entities (e.g., other avatars, traffic & urban planners, civil engineers, marketing personnel, etc.). For example, duration at a locale indicates possible interest, or disinterest, in a particular item, location, storefront, and the like. Similarly, movement time between coordinates may indicate speed of avatars, which may aid entities (e.g., traffic planners, law enforcement, etc.). The angle an avatar is positioned may indicate a point of interest, which similarly can aid marketing entities and/or the like.

Figure 6:
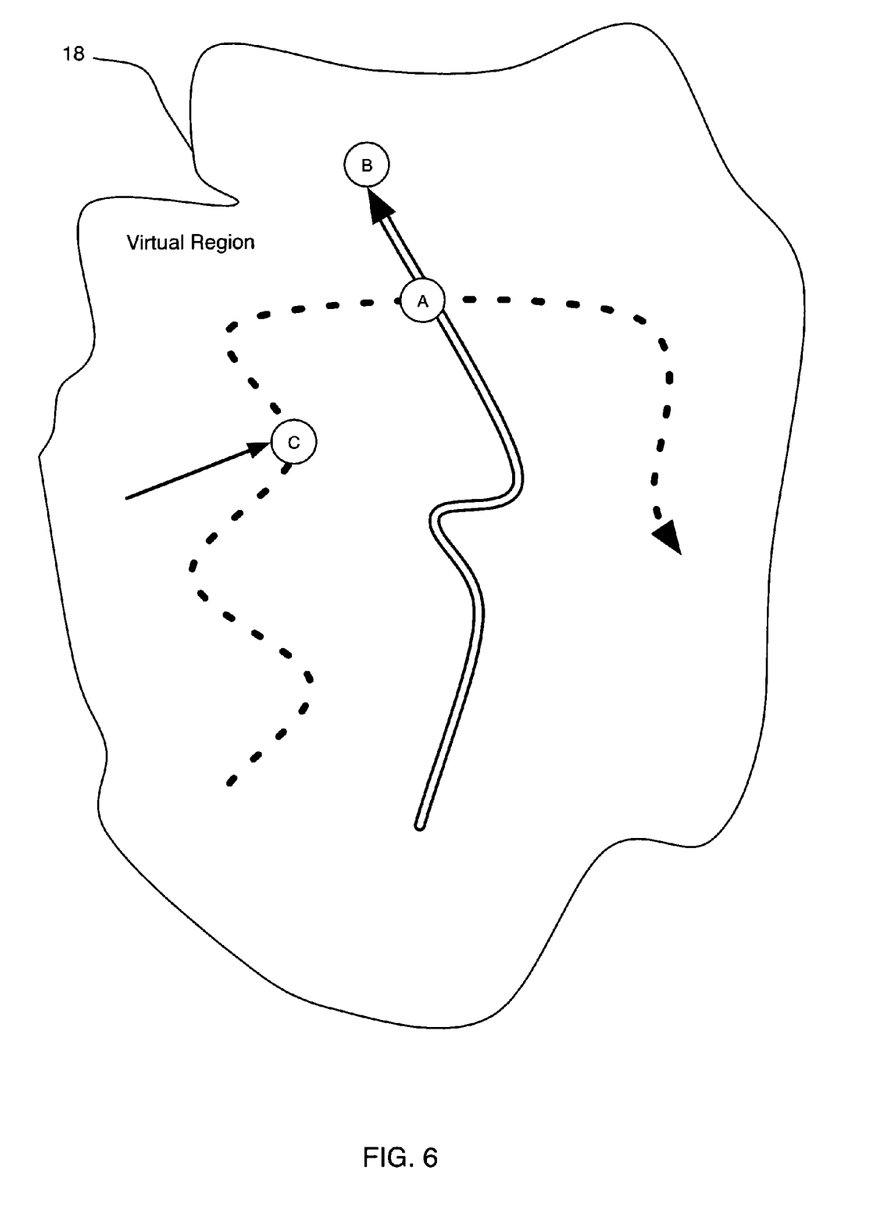
FIG. 6 depicts various movement renderings provided by a user trajectory monitoring tool in accordance with an embodiment of the present invention.

Once recorded, the movement (e.g., coordinates, path, etc.) may be used or processed in a variety of ways, or combination of ways, under aspects of the present invention. The movement may be rendered as a visible path that others may be given access to see. Alternatively, the recorded movement may allow owners of the recorded path to verify if others have traversed an established percentage of the path, such as for compensation or race officiating. For example, FIG. 6 shows an example of a rendering in a virtual region 18. As depicted, there are multiple trajectories shown. Each trajectory may connote the movement of one avatar, multiple avatars, a group of avatars, and/or all avatars. Similarly, certain locations (e.g., "A", "B", "C") are shown. FIG. 6 also may depict the various trajectories via different indicia. For example, a particular font, line weight, color, and/or the like may connote a certain avatar, a speed in which the avatars traversed the path, and/or quantity of avatars. Aspects of the virtual universe may be adjusted as a result of the path information.

A creator or owner of a path may share the path with other inhabitants of the virtual universe. The creator may limit the sharing of the path to specific avatars or may opt to share the path with all avatars. The virtual universe may graphically render the path. For example, a line is drawn between coordinates in the path representing the trail the creator of the path took. A colored "dot" may be placed along the line indicating locations where the avatar has stopped. In various embodiments, different colored dots provide indicia as to differing durations of inactivity at the particular locations (e.g., coordinates).

Avatars upon seeing the 'shared trail' may opt to automatically follow the trail by indicating such to the virtual universe system. For example, the interest in following the trail can be indicated by "double-clicking" the trail with an input device (e.g., mouse) or a variety of other methods to indicate interest in a trail. Once in this automatic travel mode, the virtual universe will automatically move the avatar along the trail at a predetermined or customizable velocity. In an embodiment, the user may have controls similar to media players such as pause, fast forward, reverse, stop, and record, to aid in travel.

The recorded movement of avatar(s) may be periodically combined, aggregated, and data mined by authorized users of the virtual universe to understand movement patterns within the universe. This data is helpful to virtual city planners and virtual civil engineers who are responsible for the layout and creation of regions within the virtual universe. The data may be used to modify current layout or to optimally plan and construct new layouts to ease movement and lessen congestion within regions of a virtual universe. The data may also benefit factors in determining advertising rates, real estate values, and the like.

In another embodiment, new paths may be constructed either manually or automatically for other avatars to traverse based on the recorded movements. For example, companies within the virtual universe can utilize automatic path construction to dynamically create paths for avatars when the optimal path for the company is influenced by external factors. In an embodiment, a company may employ dynamic path construction to create a path in a virtual store of items that are on sale that hour or items a stores wishes to sell quickly.

In another embodiment, companies may compensate avatars for following paths they have created. Race officiating may employ this traversal verification as well (e.g., did any contestants traverse the entire course path?). In this mode, if the avatar is to be compensated for the trail traversal, the virtual universe system can require that the avatar following the trail do so manually to ensure that the avatar is actively interacting with the trail. Additionally, the trail may require the avatar to stay in sections of the trail for specified durations. Additionally, the trail may require the avatar to stay within a specific distance from the trail. For example, in a situation where the trail is in the center of the road, it may allow the avatar to traverse the trail anywhere along the road, yet prevent down a side street off the road.

In another embodiment of the invention, the user trajectory monitoring tool 53 is used as a service to charge fees for each user, or group of users, that is monitored or possibly for each movement rendering that is provided. In this embodiment, the provider of the virtual universe or a third party service provider could offer this trajectory monitoring tool as a service by performing the functionalities described herein on a subscription and/or fee basis. In this case, the provider of the virtual universe or the third party service provider can create, deploy, maintain, support, etc., the user trajectory monitoring tool 53 that performs the processes described in the disclosure. In return, the virtual universe or the third party service provider can receive payment from the virtual universe residents via the universe economy management component 70 and the commercial transaction management component 72.

In still another embodiment, the methodologies disclosed herein can be used within a computer system to monitor user trajectory within a virtual universe. In this case, the user trajectory monitoring tool 53 can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

Figure 7:
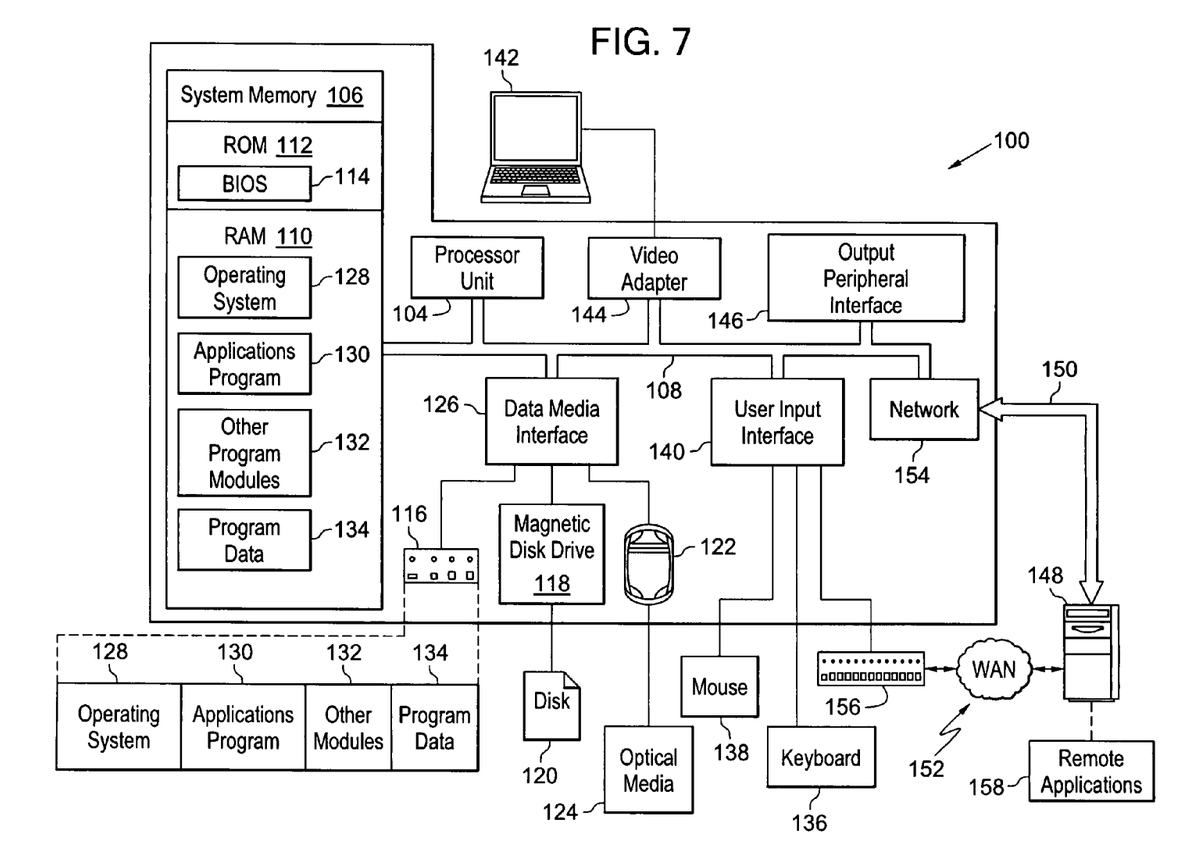
FIG. 7 depicts an illustrative computer system for implementing embodiment(s) of the present invention.

FIG. 7 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 7.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 7, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 7, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 7 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including the server array 14, the virtual universe client 24 and the user trajectory monitoring tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 7 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 7 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach for event determination in a virtual universe. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for monitoring a user trajectory in a virtual universe, comprising:
   recording an activity of a first avatar within a virtual universe, the activity including a series of locations that the avatar has occupied within the virtual universe over a time period, the virtual universe including an interactive simulated environment accessed by multiple users simultaneously by using avatars to inhabit and interact with the virtual universe;
   rendering the recording of the activity as a visible path that illustrates a movement of the first avatar over the time period;
   recording a second activity of a second avatar, which is unaffiliated with the first avatar, within the virtual universe, the second activity including a second series of locations that the avatar has occupied within the virtual universe over a time period;
   rendering the recording of the second activity as a visible path that illustrates a movement of the second avatar over the time period;
   aggregating first and second visible paths to determine common movement patterns within the virtual universe; and
   using the aggregating to perform a subsequent activity in the virtual universe, wherein the subsequent activity includes modifying a geographic layout of the virtual universe by relocating a structural item within a virtual region in the virtual universe with respect to another structural item in the virtual region of the virtual universe.

2. The method of claim 1, further comprising monitoring at least one region for an activity of the least one avatar.

3. The method of claim 1, wherein the recording further comprises recording coordinates of movement of the at least one avatar, and wherein the visible path shows a rate of movement of the at least one avatar and an amount of time spent at a particular location by the at least one avatar.

4. The method of claim 1, wherein the visible path is a map view.

5. The method of claim 1, wherein the recording is done by one of: user selection or anonymously.

6. The method of claim 1, further comprising forwarding the visible path to a third party.

7. The method of claim 1, wherein the at least one avatar is a group of avatars.

8. The method of claim 1, further comprising verifying if the activity is conducted at a specific location.

9. The method of claim 1, wherein the activity is one of: a movement, duration at a coordinate, time between coordinates, or angle of positioning.

10. A system for monitoring a user trajectory in a virtual universe, comprising:
    a computer system having at least one computer device that performs a method comprising:
    recording an activity of a first avatar within a virtual universe, the activity including a series of locations that the avatar has occupied within the virtual universe over a time period, the virtual universe including an interactive simulated environment accessed by multiple users simultaneously by using avatars to inhabit and interact with the virtual universe;
    rendering the recording of the activity as a visible path that illustrates a movement of the first avatar over the time period;
    recording a second activity of a second avatar, which is unaffiliated with the first avatar, within the virtual universe, the second activity including a second series of locations that the avatar has occupied within the virtual universe over a time period;

rendering the recording of the second activity as a visible path that illustrates a movement of the second avatar over the time period;

aggregating first and second visible paths to determine common movement patterns within the virtual universe; and using the aggregating to perform a subsequent activity in the virtual universe, wherein the subsequent activity includes modifying a geographic layout of the virtual universe by relocating a structural item within a virtual region in the virtual universe with respect to another structural item in the virtual region of the virtual universe.

11. The system of claim 10, further comprising monitoring at least one region for an activity of the least one avatar.

12. The system of claim 10, wherein the recording further comprises recording coordinates of movement of the at least one avatar, and wherein the visible path shows a rate of movement of the at least one avatar and an amount of time spent at a particular location by the at least one avatar.

13. The system of claim 10, wherein the visible path is a map view.

14. The system of claim 10, wherein the system for recording operates by one of: user selection or anonymously.

15. The system of claim 10, further comprising forwarding the visible path to a third party.

16. The system of claim 10, wherein the at least one avatar is a group of avatars.

17. The system of claim 10, further comprising verifying if the activity is conducted at a specific location.

18. The system of claim 10, wherein the activity is one of: a movement, duration at a coordinate, time between coordinates, or angle of positioning.

19. A program product stored on a non-transitory computer readable medium, which when executed, monitors a user trajectory in a virtual universe, the computer readable medium comprising program code that performs a method, comprising:

recording an activity of a first avatar within a virtual universe, the activity including a series of locations that the avatar has occupied within the virtual universe over a time period, the virtual universe including an interactive simulated environment accessed by multiple users simultaneously by using avatars to inhabit and interact with the virtual universe;

rendering the recording of the activity as a visible path that illustrates a movement of the first avatar over the time period;

recording a second activity of a second avatar, which is unaffiliated with the first avatar, within the virtual universe, the second activity including a second series of locations that the avatar has occupied within the virtual universe over a time period;

rendering the recording of the second activity as a visible path that illustrates a movement of the second avatar over the time period;

aggregating first and second visible paths to determine common movement patterns within the virtual universe; and using the aggregating to perform a subsequent activity in the virtual universe, wherein the subsequent activity includes modifying a geographic layout of the virtual universe by relocating a structural item within a virtual region in the virtual universe with respect to another structural item in the virtual region of the virtual universe.

20. A method for deploying an application for monitoring a user trajectory in a virtual universe, comprising:

providing a computer infrastructure being operable to:

record an activity of a first avatar within a virtual universe, the activity including a series of locations that the avatar has occupied within the virtual universe over a time period, the virtual universe including an interactive simulated environment accessed by multiple users simultaneously by using avatars to inhabit and interact with the virtual universe;

render the recording of the activity as a visible path that illustrates a movement of the first avatar over the time period;

record a second activity of a second avatar, which is unaffiliated with the first avatar, within the virtual universe, the second activity including a second series of locations that the avatar has occupied within the virtual universe over a time period;

render the recording of the second activity as a visible path that illustrates a movement of the second avatar over the time period;

aggregate first and second visible paths to determine common movement patterns within the virtual universe; and use the aggregating to perform a subsequent activity in the virtual universe, wherein the subsequent activity includes modifying a geographic layout of the virtual universe by relocating a structural item within a virtual region in the virtual universe with respect to another structural item in the virtual region of the virtual universe.

* * * * *